Figure 5:
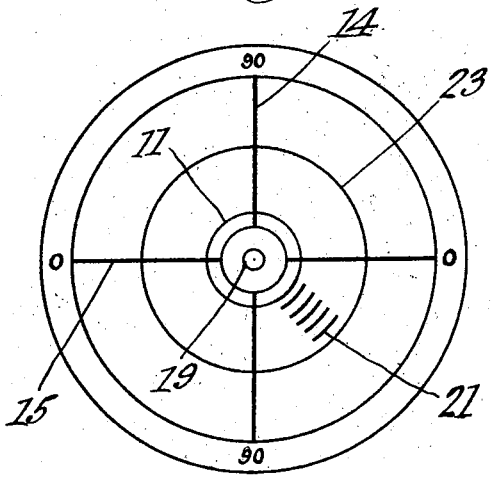

Mar. 3, 1925. 1,528,138
H. WATSON
LENS TESTING INSTRUMENT
Filed June 18, 1924 2 Sheets-Sheet 1
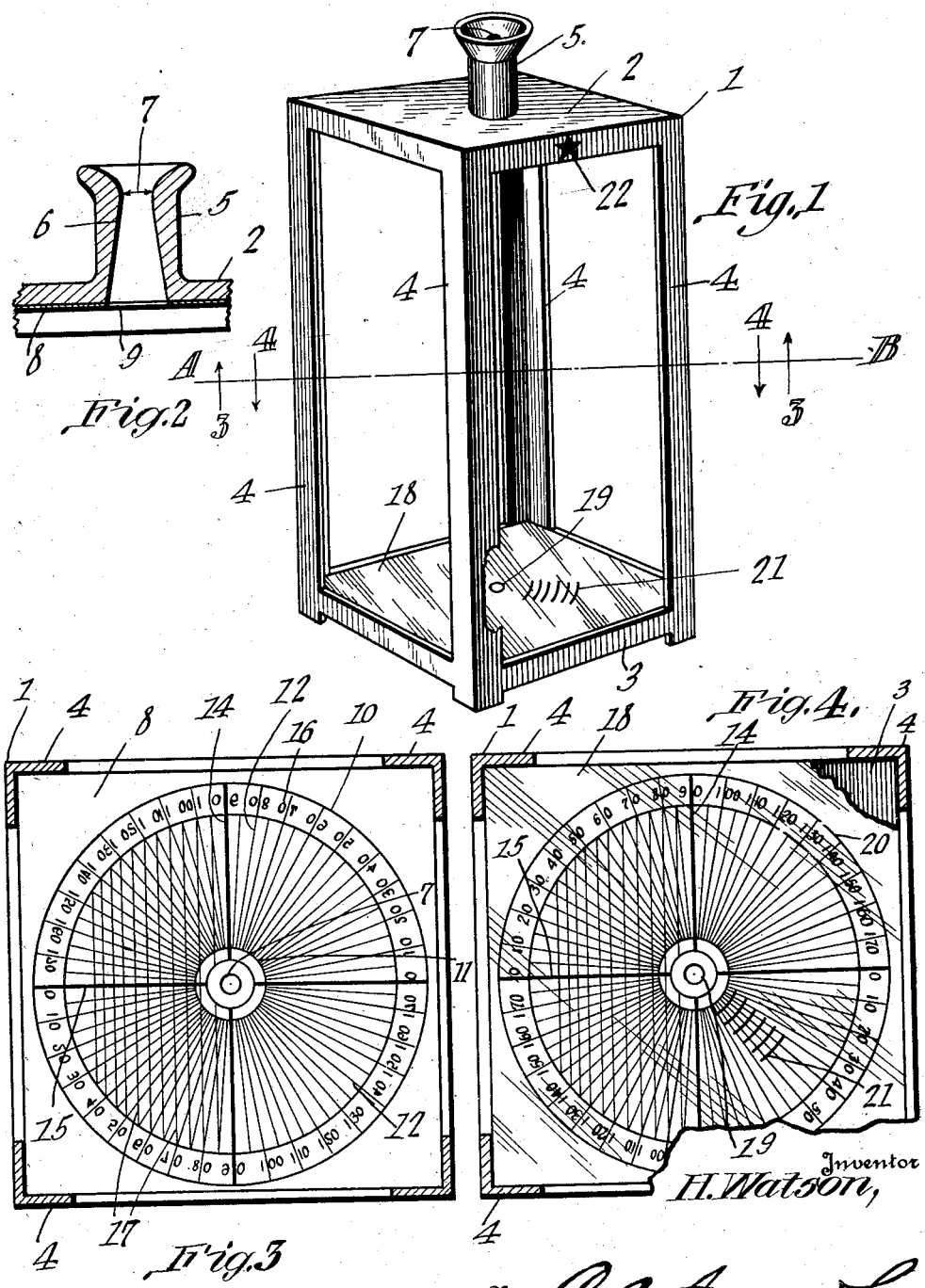

Patented Mar. 3, 1925.

1,528,138

UNITED STATES PATENT OFFICE.

HARRY WATSON, OF JACKSON, MISSISSIPPI.

LENS-TESTING INSTRUMENT.

Application filed June 18, 1924. Serial No. 720,810.

*To all whom it may concern:*

Be it known that I, Dr. HARRY WATSON, a citizen of the United States, residing at Jackson, in the county of Hinds and State of Mississippi, have invented a new and useful Lens-Testing Instrument, of which the following is a specification.

This invention aims to provide a simple instrument by which it may be determined when a lens is de-centered or prismatic, and how much the lens is off center. The invention aims to provide an instrument whereby the power of a lens in diopters may be determined, and whereby the axis and power of a cylindrical lens may be ascertained.

It is within the province of the disclosure to improve generally and to enhance the utility of devices of that sort to which the invention appertains.

Although a preferred form has been shown, an instrument-maker working within the scope of what is claimed, may make changes, without departing from the spirit of the invention.

In the drawings:—Figure 1 shows in perspective, a device constructed in accordance with the invention; Figure 2 is a section showing a portion of the upper part of the frame; Figure 3 is a cross section on the line A—B of Figure 1, looking in the direction of the arrows 3—3; Figure 4 is a section on the line A—B of Figure 1, looking in the direction of the arrows 4—4; and Figures 5, 6, 7 and 8 are diagrams illustrating the operation of the instrument.

The device forming the subject matter of this application comprises a frame 1 which may be variously constructed, the frame, if desired, comprising a top 2, a base 3, and standards 4 connecting the base and the top at the corners thereof. The top 2 carries an eye piece 5 having a tapered passage 6, the least diameter of the passage being indicated in Figure 2 by the numeral 7. A sheet 8 may be mounted on the lower surface of the top 2 and has an opening 9 registering with the wider end of the passage 6 in the eye piece 5. On the sheet 8 is inscribed a protractor 10, the numerals of which are reversely placed. The protractor 10 includes an inner circle 11, radial lines 12 extended inwardly to the said circle and radial lines 14 and 15 extended inwardly to the opening 9 in the sheet 8, the lines 14 and 15 being heavier than the lines 12 and being disposed at right angles to each other. At the outer ends of the radial lines 12, 14 and 15 the graduations 16 of the protractor are placed. Parallel lines 17 connect the ends of certain of the radial lines 12 and are disposed parallel to the lines 14, at one side thereof.

The base 3 of the frame 1 carries a mirror 18. The mirror 18 is provided with a circular mark 19 disposed in the prolonged axis of the passage 6 in the eye piece 5, the mark 19 preferably being of the same diameter as the most constricted portion 7 of the passage 6 in the eye piece 5, to avoid, so far as possible, errors due to parallax. The protractor 10 is reflected in the mirror 18, as shown at 20 in Figure 4, and appears erected in the mirror, when the operator peers downwardly through the passage 6 of the eye piece 5, because the protractor is reversely inscribed on the sheet 8. The mirror 18 is supplied with a plurality of marks 21 denoting different radial distances from the mark 19, and, more specifically, from the inner circle 11 of the protractor. The marks 21 are so spaced that the distance between any two of them represents one diopter, the marks being so disposed that the amount that they are magnified is negligible, the magnification, due to the presence of a lens in the instrument, being confined to the reflection of the inner circle 11 of the protractor 10 in the mirror 18. In order that the reflection of the protractor 10 in the mirror 18 may appear properly with respect to the observer, the top 2 is supplied on one edge with an index 22 which should be toward the observer when the instrument is in operation.

Referring to Figure 5, suppose that the operator wishes to test a spherical lens 23 (which happens to be correctly centered). The lens 23 is placed on the mirror 18 and the operator looks downwardly through the eye piece 5, the lens being shifted about until its geometrical center registers with the mark 19 on the mirror 18. The cross formed by the lines 14 and 15 remains unbroken, and these lines appear at right angles to each other, it thus being made manifest that the lens is correctly centered and has no prism. Referring to Figure 4, it will be observed that the innermost one of the marks 21 is spaced from the inner circle 11 of the protractor 10 when there is no lens on the mirror 18. Reverting to Figure 5, it will be observed that when the lens 23 is placed on the mirror 18, the innermost one of the marks 21 coincides with the inner circle 11 of the protractor 10, as reflected in the mirror 18, and the operator is advised that the power of the lens is one diopter.

Figure 6:
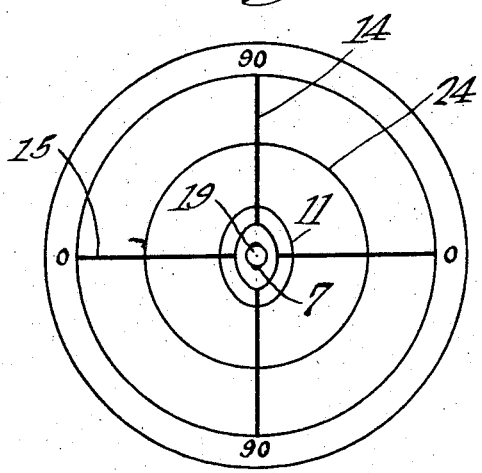

Passing to Figure 6, a cylindrical lens 24 is shown in place on the mirror 18. The lines 14 and 15 remain unbroken, but the inner circle 11 is distorted into an ellipse, thus showing that the lens is a cylinder.

Figure 7:
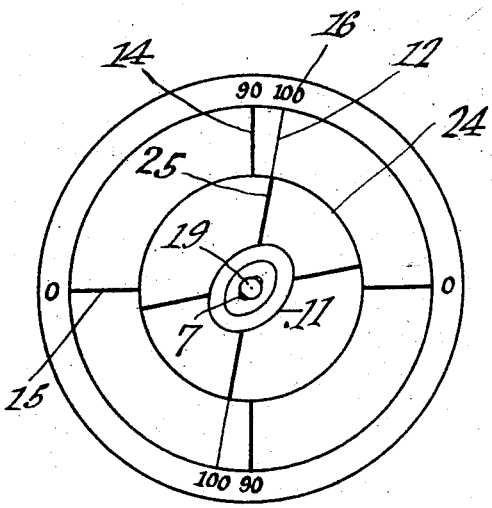

As shown in Figure 7, the lens 24 may be rotated clockwise until the distorted portion 25 of the line 14 coincides with one of the radial lines 12 as reflected in the mirror, and by noting the appropriate graduations 16, the angular position of the axis of the cylinder may be determined. By rotating the lens 24 counter-clockwise, until the distorted portion 25 of the line 14 coincides with the outer end of one of the lines 17, the cylindric power of the lens in diopters may be ascertained through a suitable calibration of the lines 17.

Figure 8:
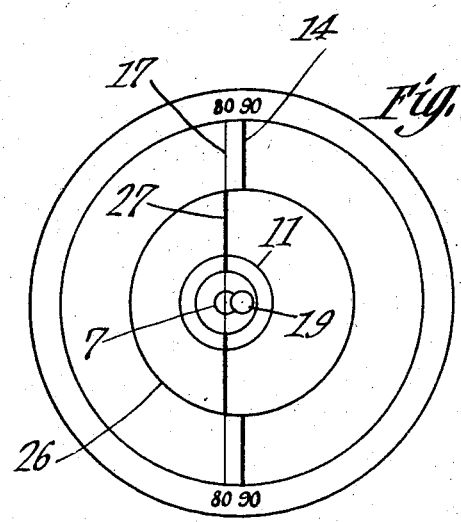

In Figure 8, a de-centered prismatic lens 26 is shown in place, and it will be observed that the lens causes a part of the line 14 to be offset as shown at 27, and the part 27 of the line 14, cooperating with the appropriate one of the lines 17, indicates how much the lens is off center. By sliding the lens 26 until the line 14 appears continuous, that is, until there is no apparent offset like the part 27 of the line 14, the operator may ascertain the optical center of the lens.

What is claimed is:—

1. An instrument for testing lenses, comprising a top having an eye piece, and a base having a mirror provided with a center point cooperating with the eye piece, the top being provided with a protractor so located as to be reflected in the mirror about the center point, the protractor comprising an inner circle and radial lines extended outwardly from the circle, certain of the radial lines which are at right angles to each other being accentuated to form a cross.

2. An instrument for testing lenses, comprising a top having an eye piece, and a base having a mirror provided with a center point cooperating with the eye piece, the top being provided with a protractor so located as to be reflected in the mirror about the center point, the protractor comprising an inner circle and radial lines extended outwardly from the circle, certain of the radial lines which are at right angles to each other forming a cross, the protractor including other lines which are parallel to each other and parallel to one of the cross-forming lines.

3. An instrument for testing lenses, comprising a top having an eye piece, and a base having a mirror provided with a center point cooperating with the eye piece, the top being provided with a protractor so located as to be reflected in the mirror about the center point, the protractor having radial lines, certain of which are at right angles to each other and are so constructed as to define a cross, the mirror being provided with marks located at different radial distances from the center point of the mirror.

4. An instrument for testing lenses, comprising a top having an eye piece, and a base having a mirror provided with a center point cooperating with the eye piece, the top being supplied with a protractor so located as to be reflected in the mirror about the center point, the protractor comprising an inner circle and radial lines extended outwardly from the circle, certain of the radial lines which are at right angles to each other being accentuated to form a cross, the protractor including other lines parallel to each other and parallel to one of the cross-forming lines, the mirror being supplied with marks located at different radial distances from the center point of the mirror.

In testimony that I claim the foregoing as my own, I have hereto affixed my signature in the presence of two witnesses.

HARRY WATSON, O. D.

Witnesses:
A. S. UPPLEWHITE, M. D.,
N. J. MILSHADRESS.